US005319486A

United States Patent [19]

Vogel et al.

[11] Patent Number: 5,319,486

[45] Date of Patent: Jun. 7, 1994

[54] TRANSMISSION EQUIPMENT WITH AN OPTICAL TRANSMISSION LINE

[75] Inventors: Paul Vogel, Steffisburg; Thomas Martinson, Fribourg, both of Switzerland

[73] Assignee: Ascom Tech AG, Bern, Switzerland

[21] Appl. No.: 730,784

[22] PCT Filed: Nov. 22, 1990

[86] PCT No.: PCT/CH90/00269

§ 371 Date: Jul. 24, 1991

§ 102(e) Date: Jul. 24, 1991

[87] PCT Pub. No.: WO91/09476

PCT Pub. Date: Jun. 27, 1991

[30] Foreign Application Priority Data

Dec. 12, 1989 [CH] Switzerland ...................... 04460/89

[51] Int. Cl.[5] ...................... H04B 10/12; H04J 14/08

[52] U.S. Cl. .................................... 359/139; 359/165

[58] Field of Search ............................... 359/118–120, 359/125, 127–128, 137–139, 165, 177, 157, 173

[56] References Cited

U.S. PATENT DOCUMENTS

| | | | |
|---|---|---|---|
| 4,166,946 | 9/1979 | Chown | 359/119 |
| 4,225,753 | 9/1980 | Chown | 359/119 |
| 4,346,478 | 8/1982 | Sichling | 359/165 |
| 4,742,572 | 5/1988 | Yokoyama | 359/119 |
| 4,783,851 | 11/1988 | Inou | 359/165 |
| 4,855,729 | 8/1989 | Takeuchi | 359/165 |
| 4,939,721 | 7/1990 | DeBosio | 359/165 |
| 5,130,835 | 7/1992 | Stegmeier | 359/128 |

FOREIGN PATENT DOCUMENTS

| | | |
|---|---|---|
| 0094866 | 11/1983 | European Pat. Off. . |
| 0001835 | 5/1984 | World Int. Prop. O. . |

*Primary Examiner*—Leslie Pascal

*Attorney, Agent, or Firm*—McAulay Fisher Nissen Goldberg & Kiel

[57] ABSTRACT

The transmission equipment includes a plurality of subscriber nodes which are connected serially to an optical fiber. Every node comprises an access unit with at least one directional coupler, an address detection unit, a receiver, a synchronization unit, as well as a control unit with a switching transmitter. Addressed packets continuously reach the nodes and pass through the latter via the fiber in the form of modulated light. In a first switching position, the directional coupler branches off a part of the light power of the packets from the fiber, converts the light in the optoelectrical transducer into electrical signals and reads the respective packet address in the detection unit. If this packet address matches the address of the node the control unit switches the directional coupler into a second switching position. The coupler branches off another part of the light power of the packet in this second switching position and, in so doing, feeds the occurring electrical useful signals to the receiver. The first and second switching positions differ in that a considerably greater proportion of the respective light power is branched off from the fiber in the second position than in the first switching position.

12 Claims, 6 Drawing Sheets

SWITCHING TRANSMITTER
54
24
SYNCHRONIZATION UNIT
SWITCHING TRANSMITTER
ADDRESS DETECTION UNIT
23
72
70
73
71
CONTROL UNIT
RECEIVER
51
50.1
51
50.2
44
44
11
11
30.1 DIRECTIONAL COUPLER
ACCESS UNIT 13
30.2 DIRECTIONAL COUPLER
SUBSCRIBER NODE
12

TRANSMISSION EQUIPMENT WITH AN OPTICAL TRANSMISSION LINE

BACKGROUND OF THE INVENTION a) Field of the Invention

The invention is directed to transmission equipment with an optical transmission line to which a plurality of subscriber nodes are connected.

b) Background Prior Cut

Transmission equipment and diverse types of information transmission via transmission lines are known in general. Recently, optical transmission lines have become increasingly important for various reasons. In addition to the optical point-to-point connections, complicated network structures with optical lines are also known. For example, in an article entitled "Optical fibres in local area networks", Communications/Communications International, October 1985, pages 19 ff., B. Viklund describes various network structures with glass fiber cables for distribution networks and for networks with connections between diverse subscribers which can be set up individually. In the latter, a ring structure is most favorable. The subscriber stations of an optical transmission line of the aforementioned type are connected to the respective utilized fibers via optoelectrical couplers.

At present, there are components for optical systems, e.g. couplers, switches and modulators, based e.g. on GaAs semiconductor material which utilize electro-optical effects in order to influence light. These elements work up to frequencies in the gigahertz range (Gbit/s).

The use of address-coded packets for the transmission of information is generally known. Such packets comprise a header and an information part [hereinafter, infopart], wherein the header contains all necessary data for the respective packet and the participating devices, e.g. a destination or target address, data concerning the type of packet, monitoring bits, etc. The infopart is available for the useful information to be transmitted.

When receiving information arriving via an optical line it is unavoidable that at least a part of the light stream carrying the information is used. If the light stream on the transmission line is not regenerated in some way, then it is gradually reduced in reception nodes which are connected serially one after the other.

The connection and access nodes of such transmission equipment generally comprise electrical regenerators. The latter require optoelectrical and electro-optical transducers, so that, as a whole, this is rather a matter of mixed optical and electrical equipment.

The primary object of the invention consists in providing transmission equipment which makes do to a great extent without electrical regenerators while utilizing the aforementioned components. In this way, a system is to be provided which must be referred to as "optical" in a more literal sense than was previously the case.

This object is met by the characterizing part of the independent claims. The dependent claims show constructions of the invention.

The solution, according to the invention, makes it possible to provide flexible transmission equipment which has considerable advantages over the comparable, previously known equipment because of its more extensive optical construction. An outstanding immunity to electromagnetic interference and reduced jitter problems are to be mentioned in particular; there is also a reduction in interference sources caused by bit errors. In addition, the transmission equipment is extensively protected against the failure of individual subscriber nodes.

The invention is described in more detail in the following by way of example with reference to eight diagrams.

DESCRIPTION OF THE PREFERRED EMBODIMENT

Figure 1:
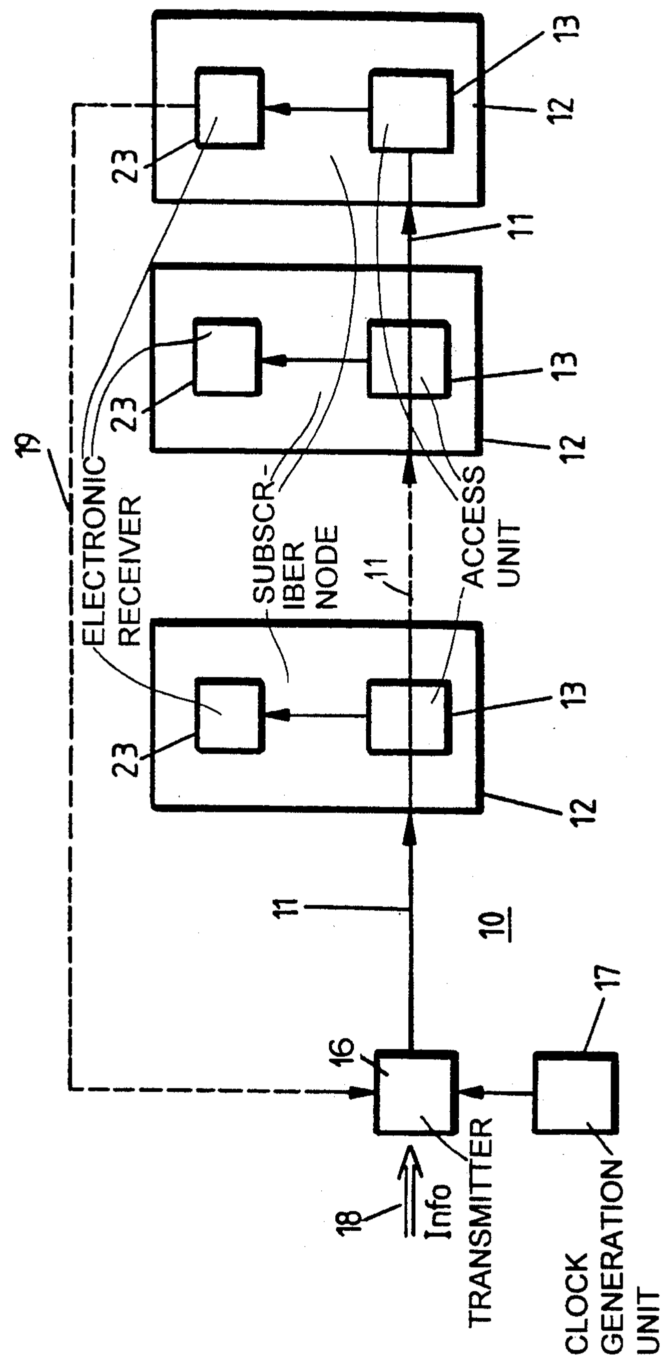
FIG. 1 is a schematic view of optical transmission equipment.

FIG. 1 shows a schematic view of transmission equipment 10 on which information is transmitted in the direction of the arrow in the form of addressed packets. An optical fiber 11, particularly a mono-mode fiber, serves as transmission medium. A plurality of subscriber nodes 12 are incorporated in series in this fiber 11, so that the fiber 11 is divided into portions, but the light stream, as a whole, is not interrupted. An address is assigned to each subscriber node 12 by which it is distinguished from all other nodes. However, it is also possible for the same address to be assigned to a plurality of nodes 12.

The light stream commences in a transmitter 16, particularly a semiconductor laser, which feeds a substantially continuous constant light stream into the commencement of the fiber 11, and a subsequently arranged modulator for modulating this constant light stream. The modulated light stream passes through the fiber 11 and, in so doing, passes through all subscriber nodes 12 without interruption. These nodes comprise access units 13 which do not interrupt the light stream, as was described. The subscriber nodes 12 are further constructed in such a way that they can receive the packets contained in the light stream which are addressed to them. For this purpose, electronic receivers 23 which process the useful information contained in the packets are connected subsequent to the access units 13. The modulation can be selected in such a way that e.g. existing light or high light power or high light intensity or brightness represents the logical 1 state and nonexisting light or low light power or low light intensity or darkness represents the logical 0 state.

The packets originate in the transmitter 16 in that its modulator is controlled by means of a clock generation unit 17 and as a function of the useful information to be transmitted, which is indicated as a bar arrow 18.

The optical fiber 11 can be laid circularly and the receiver 23 of the last subscriber node 12 can be connected with the transmitter 16 by means of a short electrical connection 19. Accordingly, a ring-shaped arrangement is formed in which the transmitter 16 contains the single light source. But the receiver 23 of the last subscriber node 12 can also be electrically connected with the transmitter 16 of other transmission equipment 10, so that a doubling of the linear dimension is achieved. In such equipment, active transmitters 16 equipped with a light transmitter alternate with passive nodes 12 containing no light transmitter.

Figure 2:
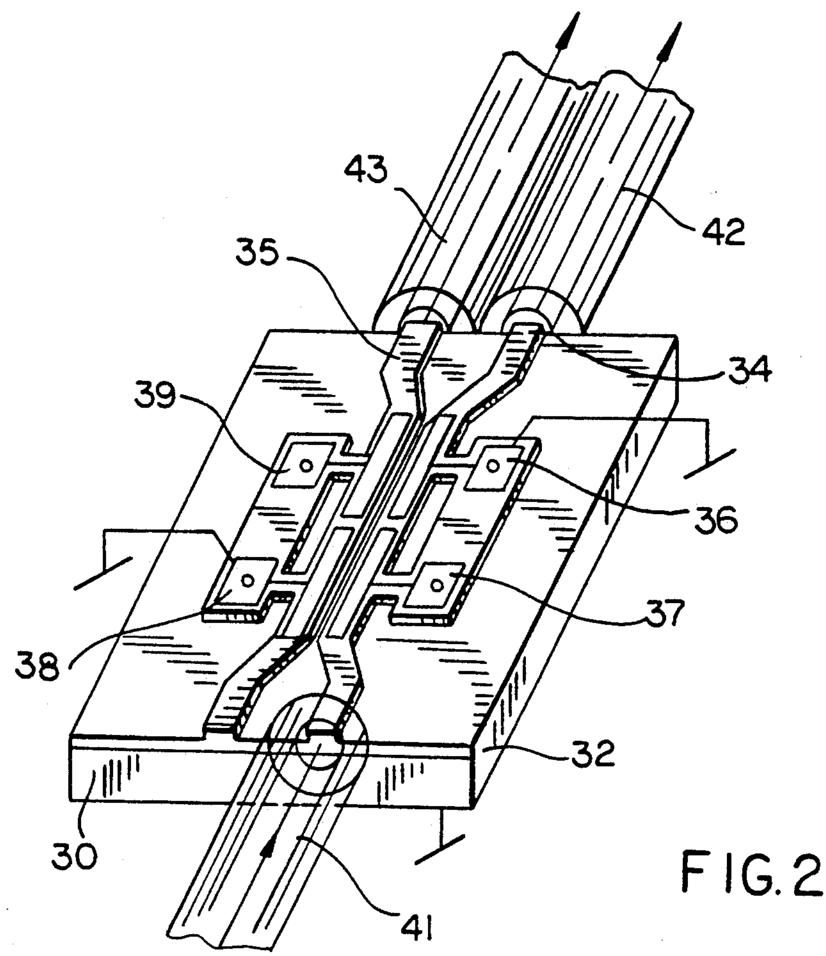
FIG. 2 is a schematic view of an optical directional coupler on a very enlarged scale.

FIG. 2 shows a schematic, greatly enlarged view of an integrated optical directional coupler 30 as the core of the aforementioned access units 13. The directional coupler 30 comprises two adjacent optical rib waveguides 34, 35, e.g. on an InP substrate 32, which rib waveguides 34, 35 are covered by a total of four metallic control electrodes 36 to 39, electrical control voltage can be applied via the latter. The directional coupler is connected on its input side to an incoming fiber, particularly a mono-mode fiber 41, by one rib waveguide 34. It is connected on its output side to an outgoing fiber 42 and 43 by both rib waveguides 34, 35, respectively.

Figure 3:
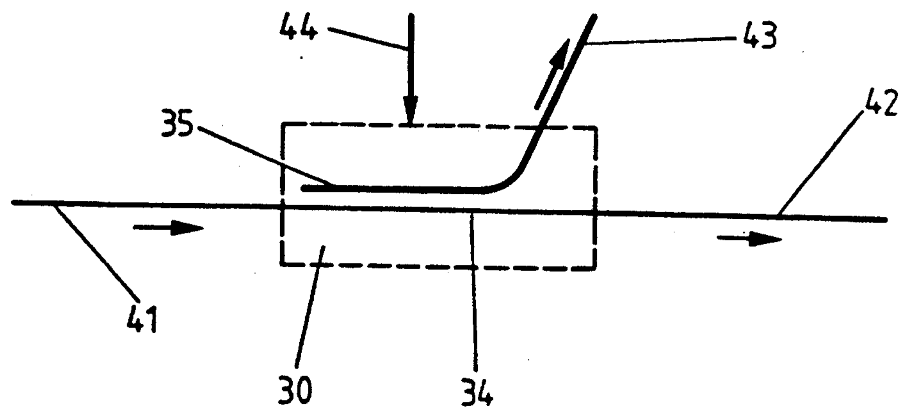
FIG. 3 is a symbolic depiction of the directional coupler.

The described directional coupler 30 serving as an example works as a light switch, wherein the light stream arriving via the fiber 41 can be divided in any ratio desired on the two outgoing fibers 42, 43 as a function of the voltages applied to the control electrodes 36 to 39. FIG. 3 is a symbolic representation of the directional coupler 30 for the purpose of expressing the switching function. The arrow 44 symbolizes the electrical control possibility which is provided by means of the control electrodes 36 to 39 (FIG. 2).

Figure 4:
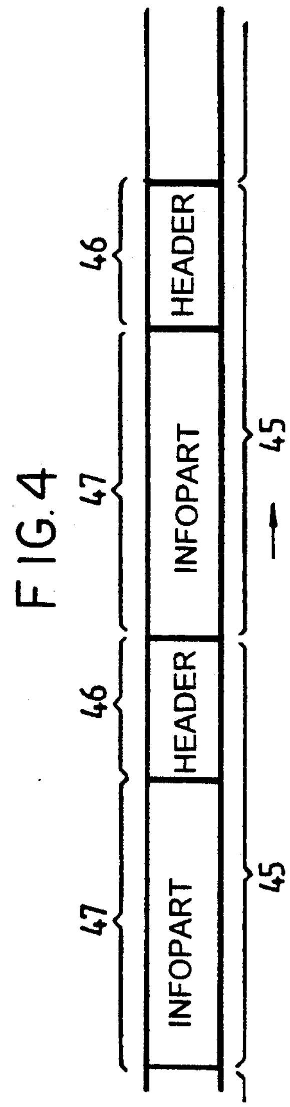
FIG. 4 is a schematic view of a series of packets.

FIG. 4 is a schematic view of a series of digital, address-coded packets 45 passing down the optical fiber 11 serially in the direction of the arrow (FIG. 1). These packets are formed by means of modulating the intensity of the light in the transmitter 16 and comprise a header 46 and an infopart 47 in each instance. If the infopart contains no information, i.e. if the infopart 47 is empty, then it is an empty packet, otherwise it is an information packet. The packets 45 follow one another without interruption and in desired sequence and comprise a considerable quantity of bits, which quantity is identical in each instance, e.g. 1000 bits. The packets 45 are accordingly all of the same length and are formed in such a way that every subscriber node 12 can independently synchronize to the bit clock BT and to the packet clock PT of the packets 45. The header 46 primarily contains a target address which indicates the subscriber nodes 12 for which the useful information contained in the infopart of the respective packet 45 is intended. Additional data are arranged in the header, which data have significance for the control of the receiving subscriber node 12 and/or for the execution of the necessary access protocols and for directing the packets 45. Finally, other areas are also provided in the header which serve for packet detection and synchronization. However, this will not be discussed in more detail here.

According to FIG. 4, the header 46 of each packet 45 is immediately followed by the respective assigned infopart 47. However, this is not compulsory. For example, there can be an intermediate zone between the header 46 and infopart 47 which serves other purposes. By way of further example, the header 46 can be divided into two or more subdivisions which subdivide the infopart 47 or are distributed to the commencement and the end of the packet 45.

The packets 45 successively pass through all subscriber nodes 12, as was described. In so doing, the light stream carrying the information or the light intensity or the light power of the packets diminishes because of the losses in the optical fibers 11 on the one hand and because of branch losses in the access units 13 on the other hand. This will be discussed more extensively in the following.

As mentioned, a respective assigned receiver or target address is contained in the header 46 of every packet 45. Every subscriber node 12 therefore reads the headers 46 of all packets 45 arriving via the fiber 11 and the address information contained in them. For this purpose, every node 12 branches off a portion of the total light power of the header 46 for the duration of a header 46 and reads the address contained therein, this portion being as small as possible, but sufficient with respect to its intensity. If the address indicates that the respective packet is not intended for the respective subscriber node 12, the associated infopart 47 is left with its complete or at least approximately complete light power, i.e. without being impeded, on the transit path traversing the respective node. On the other hand, if the address indicates that the useful information of the respective packet 45 is determined for the respective subscriber node 12, the associated infopart 47 and the light carrying the useful information, respectively, is controlled in the direction of the receiver 23.

Figure 5:
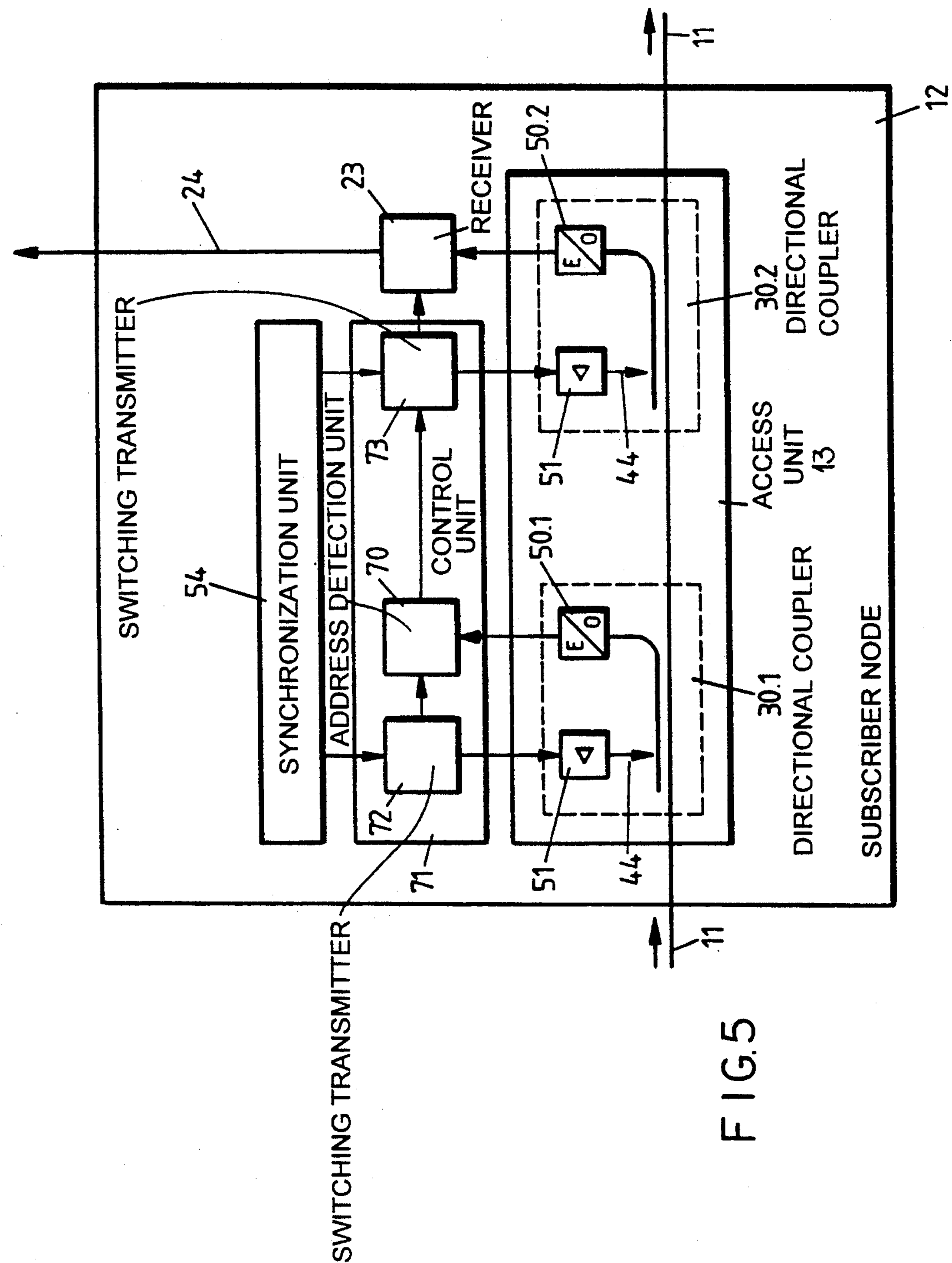
FIG. 5 is a block wiring diagram of a subscriber node.

FIG. 5 shows a first block wiring diagram of a subscriber node 12 for implementing the described method. The described access unit 13 comprising two directional couplers 30.1, 30.2 of the type described above, a subsequently connected optoelectrical transducer 50.1, 50.2 and, in each instance, a control amplifier 51 which drives the aforementioned control electrodes 36–39 (FIG. 2) and 44 (FIG. 3) of the directional coupler is incorporated in the optical fiber 11. The two directional couplers 30.1, 30.2 are switchable in two different switching positions by means of a control unit 71. In one of these switching positions, all light remains on the fiber 11 or the through-going waveguides of the couplers, in the other switching position a portion of the arriving light, which will be described in the following, branches off and is directed to the optoelectrical transducers 50.1 and 50.2, respectively.

A receiver 23 for the useful information of a respective packet 45 is connected subsequent to the transducer 50.2. This information is continuously transmitted via the output 24 to units, not shown, for further processing.

An address detection unit 70 is connected subsequent to the other transducer 50.1. This address recognition unit 70 is a component of a control unit 71 which further comprises a first 72 and a second switching transmitter 73. The control unit 71 works as a function of a synchronization unit 54 which is synchronized independently and in correct phase with the bit clock BT and the packet clock PT on the optical fiber 11 at the respective subscriber node 12. The manner in which this synchronization from information which is branched off from the header 46 of the packets 45 is achieved is unimportant in this context and forms the subject matter of another patent application.

The subscriber node 12 according to FIG. 5 works as follows: uninterrupted packets 45 reach the node 12 on the optical fiber 11, pass through the node 12 and leave it in the direction of the arrow. Together with the directional couplers 30, the fiber 11 forms a transit path through this respective node 12. The synchronization unit 54 is synchronized to the bit clock BT and the packet clock PT of the passing packet 45. It informs the first switching transmitter 72 of the commencement of a packet 45 and the second switching transmitter 73 of the end of a packet, which events coincide in time and occur periodically because of the aforementioned uniform length of the packets 45. The two directional couplers 30.1, 30.2 can both initially be in an initial switching position, for example. This initial switching position is the aforementioned first switching position of the two directional couplers and is distinguished by the fact that the entire light power arriving via the optical fiber 11 remains on the fiber 11 so as to be practically undiminished. In this initial switching position, the light accordingly passes through the respective subscriber node 12 without attenuation and practically free of losses. This switching position of the access unit 13 is designated in the following as the third switching position c.

The switching position c forms a special position which has no significance for normal operation of the transmission equipment 10. However, it is very important when a subscriber node 12 is to be shut down intentionally for some reason or if the electronic part of a node 12 fails. In these cases, the stream of light through the respective node 12 is not interrupted or otherwise influenced, so that the other nodes 12 and the optical transmission line can continue to work so as to be completely uninfluenced. The switching position c is set in that no voltage is applied to the electrodes 36–39 of the two directional couplers 30.1, 30.2 or in that the access unit 13 receives no control voltage from the control unit 71.

In normal operation, the first switching transmitter 72 switches the address detection unit 70 to active for the duration of the header 46 of each packet 45. It simultaneously switches the first directional coupler 30.1 into its other above-mentioned switching position for the same period of time via one control amplifier 51. This other switching position is characterized in that a relatively small part of the light power present on the fiber 11 is branched off to the assigned optoelectrical transducer 50.1, while the remainder of the light power continues along the second directional coupler 30.2 to the outgoing fiber 11. The branched off light power $i_a$ should be as small as possible because of the light loss caused by it on the fiber 11. On the other hand, the branched off light power must be great enough so that the address detection unit 70 can read the target address of the respective packet 45 contained in the branched off light, as well as other possibly necessary information, without errors. This switching position of the access unit 13 is designated as the first switching position a.

As soon as the address detection unit 70 discovers a target address which matches the address assigned to the respective node 12 it responds immediately and switches the second directional coupler 30.2 into its other switching position and the first directional coupler 30.1 back into its first switching position via the second switching transmitter 73 (and the assigned control amplifier 51). Accordingly, a substantial portion of the light power or possibly the existing light power $i_n$ in its entirety is then directed from the fiber 11 to the assigned transducer 50.2. This last switching position of the access unit 13 to be described is designated as the second switching position b. In this switching position b, the transducer 50.2 reads the useful information of the infopart 47 of the respective packet 45 and transmits this useful information via its output 24. Simultaneous with the end of the respective packet 45, the synchronization unit 54 switches the second directional coupler 30.2 back into its initial switching position, so that the header 46 of the next packet 45 can arrive on the fiber 11 in the outgoing direction in an unimpeded manner. The first directional coupler 30.1 is simultaneously switched into its other switching position again, so that the address of the next packet 45 is readable.

As an alternative to that described above, the first directional coupler 30.1 can be switched into its other aforementioned switching position in a general and fixed manner by the first switching transmitter 72, so that a light power sufficient for reading the addresses is continuously branched off from the transit path. In this case, the control unit 71 can be constructed in a substantially simpler manner with respect to the first switching transmitter 72. On the other hand, a constant light loss due to the first directional coupler 30.1 must be taken into account in return.

In any event, the light power $i_a$ branched off from the optical fiber 11 by the first directional coupler 30.1 is considerably less than the power $i_n$ branched off by the second directional coupler 30.2. This is of decisive importance for the present invention.

Figure 6A:
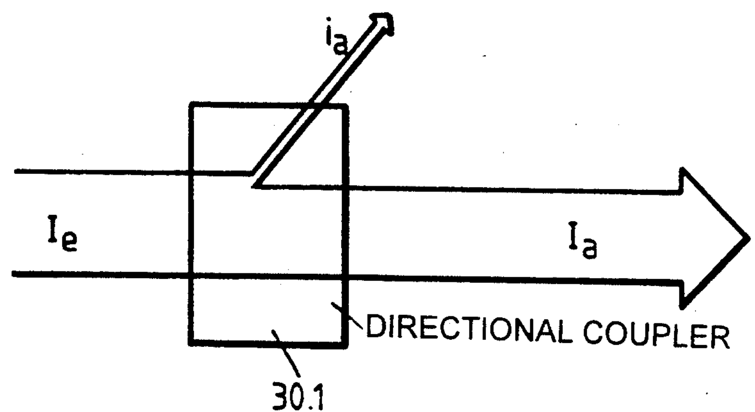
FIG. 6 is a diagram for the division of light streams.
Figure 6B:
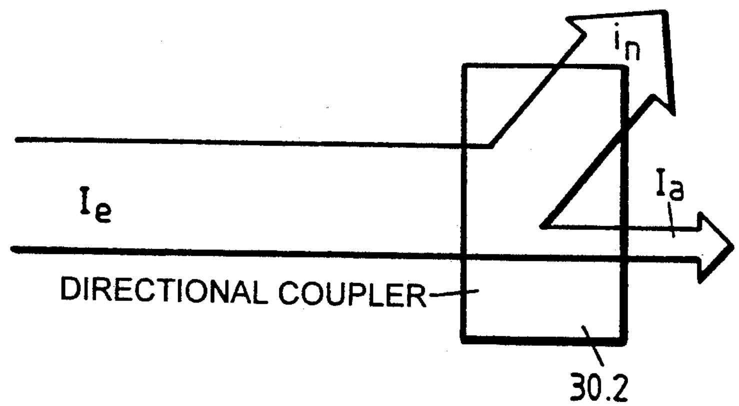

FIG. 6 illustrates the described case at hand with reference to a small diagram. In illustration (a) of FIG. 6, a light stream of input power $I_e$ reaches the first directional coupler 30.1. This light power $I_e$ is divided into a branched off light stream of low power $i_a$ (address reading power) and a strong transit stream of output power $I_a$ by means of its work switching position (switching position a of access unit 13). The width of the arrows symbolizes the respective power or intensity of the light. In illustration (b), the same input light stream $I_e$ reaches the second directional coupler 30.2. The latter is now in its work switching position (switching position b of access unit 13) and branches off a considerable useful information power $i_n$. Only a relatively low residual light power $I_a$ remains on the transit path.

The reason for the different, branched off light power is as follows: the infopart 47 of each packet 45 is in general determined only for a single subscriber node 12, specifically for the node determined by the target address of the packet. This node can therefore, in principle, claim the entire light power of the aforementioned infopart 47 for itself, so that only the "dark" state remains on the transit path or optical fiber 11. A dark infopart 47 accordingly indicates that the respective packet 45 is used up, i.e. has been read by a node 12 (which preceded in the transmission direction).

The sensitivity of the second optoelectrical transducer 50.2 (FIG. 5) for the infopart 47 is so high that a bit rate of the useful information extending into the gigahertz range (Gbit/s) can be used at the given light power $i_n$ with reasonable probable error, e.g. $10^{-8}$. This means, in other words, a large bandwidth.

The header 46 of the packet 45 is another matter. In this case, each subscriber node 12 is offered the possibility of reading the respective target address, specifically in a "flying" manner as the packet 45 passes by. Accordingly, only a fraction of that light power serving for reading the useful information is available for every node 12. The relatively low address reading power $i_a$ accordingly requires a reduction of the processible bandwidth, which reduction is independent of the address reading power. This means a power density spectrum of the header 46 having a narrower band, as well as adapted filters in the first optoelectrical transducer 50.1. Accordingly, there is a substantial increase in sensitivity based chiefly on the reduction of the noise bandwidth. The sensitivity can be further increased by means of suitable types of light modulation, as well as by other measures.

On the whole, it is favorable if the bit clock or the information rate in the header 46 of the packet 45 is considerably lower than the corresponding rate in the infopart 47 or the useful information rate. The difference in level between the address reading power $i_a$ and the power $i_n$ for reading the useful information can be e.g. more than 6 dB.

Figure 7:
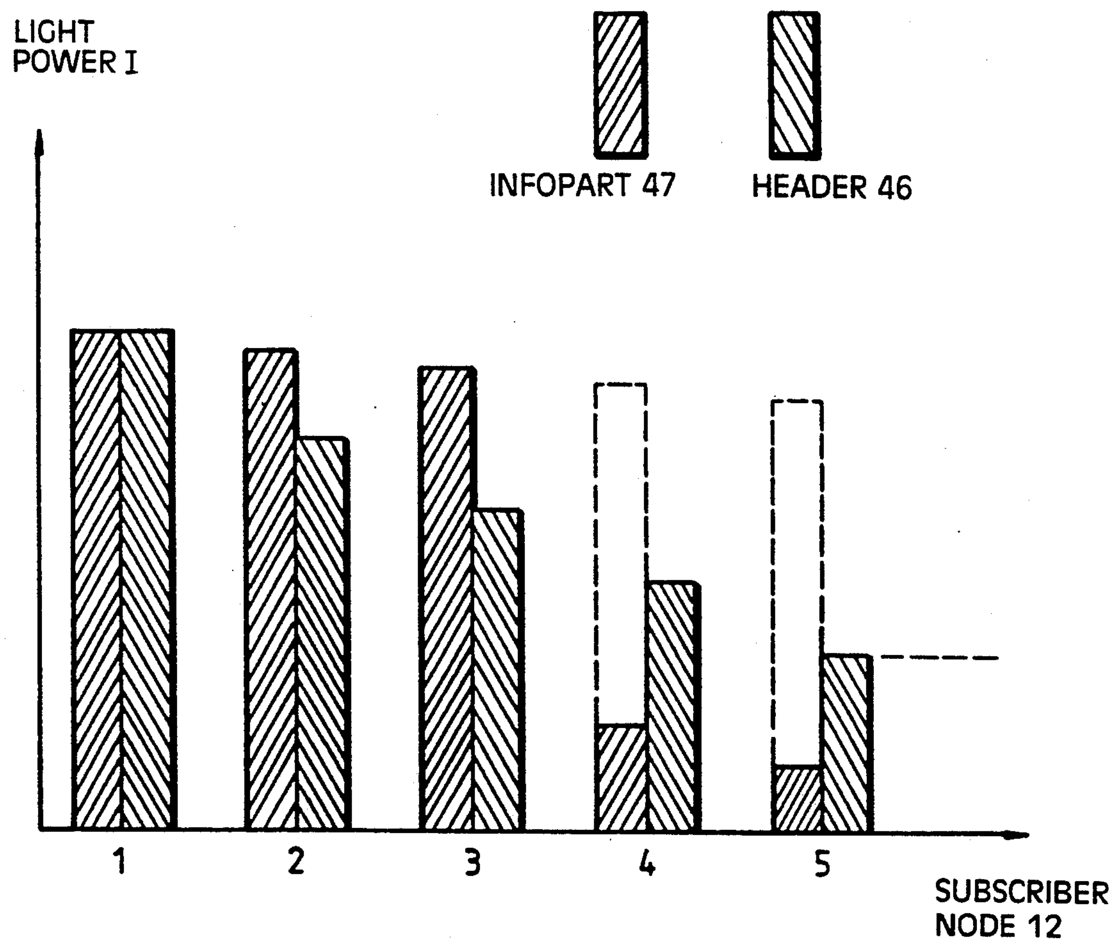
FIG. 7 is a diagram showing the dependence of the light power on the quantity of subscriber nodes.

FIG. 7 shows in a plurality of subscriber nodes 12 the dependency of the residual light power I present on the optical fiber 11 at the output of another respective subscriber node 12 in the form of a bar graph. The left-hand bar indicates the light power in the infopart 47 of the packet 45, the right-hand bar shows the light power in the assigned header 46.

The light power I is reduced from node 12 to node by means of the attenuation or the losses in the respective portion of the fiber 11 between the nodes 12 and by means of straying and reflection at the connection points or at splices. In addition to these relatively small losses, a considerable grading of the light power of the header 46 occurs because of the described branching off of the address reading power $i_a$ in every node 12. The infopart 47 suffers only the first-mentioned losses. However, as soon as the infopart 47 is read (e.g. by the fourth subscriber node 12), only a relatively small residual power remains for it.

From this follows the necessity either of adjusting the sensitivity of the optoelectrical transducers 50.1 and 50.2 as a function of the distance of the respective subscriber node 12 from the transmitter 16 or, alternatively, influencing the respective control unit 71 in such a way that, in absolute terms, the same light powers $i_a$ and $i_n$ are branched off in all nodes 12. In both cases, this can be effected by means of a one-time adjustment or preferably (since this is more flexible) continuously on the basis of a regulating device.

Figure 8:
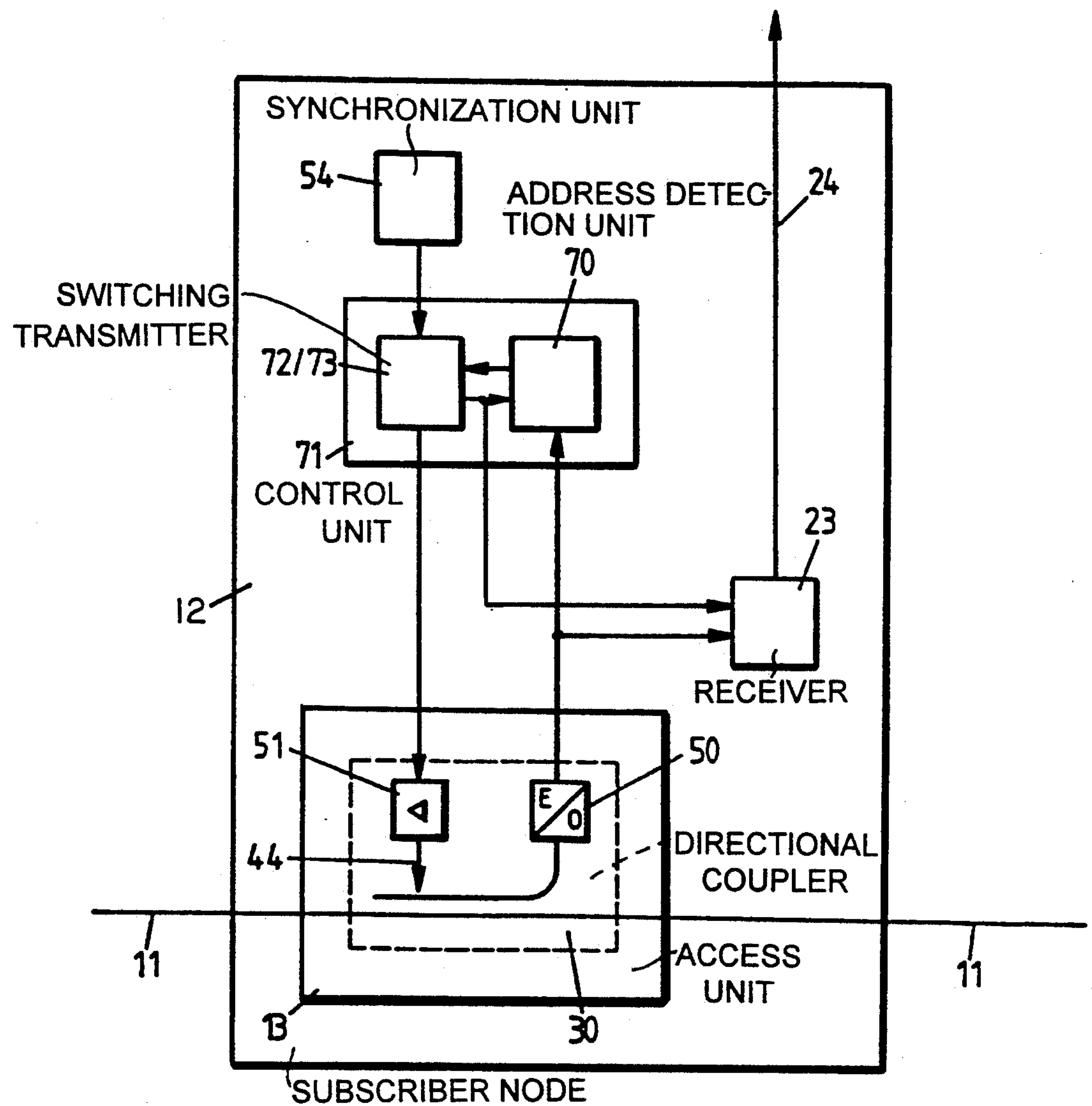
FIG. 8 is a block wiring diagram of another subscriber node.

The transmission equipment 10 allows a considerable number of variants. As the first of these, a variant of the subscriber node 12 of FIG. 5 is shown in FIG. 8. The node 12 of FIG. 8, or its access unit 13, comprises only a single directional coupler 30 which, however, can be put into three switching states. These three switching states form the aforementioned first (a), second (b) and third (c) switching positions of the access unit 13 and serve as address reading position, useful information reading position and transit position. The control unit 71 is constructed in such a way that the directional coupler 30 can be controlled to switch to the aforementioned three positions a, b, c. In so doing, the light power $i_a$ or $i_n$ which is coupled out is assigned either to the address detection unit 70 and/or directed to the receiver 23.

The optical fiber 11, e.g. a mono-mode fiber, forms only one possibility for the construction of the transmission line. More generally, the optical fiber 11 is a waveguide for guiding light which can also be realized e.g. by means of rib waveguides of semiconductor material. For example, a free transmission line which does not work with fibers, in the manner of a directional radio link, can also be considered by way of alternative. In this case, more or less permeable mirrors can serve to couple out the required address reading power $i_a$ or the useful information reading power.

The transmitter 16 can contain a constant light source, as was described, particularly a semiconductor laser whose light is subsequently modulated. Instead of this, the semiconductor laser can be modulated directly with respect to its transmitting power. Further, it is possible to produce only empty packets in the transmitter 16 which are inscribed with information individually by one or more or all subscriber nodes. In the latter case and in a ring-shaped construction of the transmission equipment, every subscriber node 12 can communicate with every other subscriber node so as to transmit and receive.

The length of the packets 45 can also be variable instead of uniform and constant insofar as the bit clock BT and packet clock PT remain controllable. Thus, for example, two packet types can be used whose lengths differ by a factor of 2 and which e.g. alternate continuously. Further, frames can be used, each of which comprises a plurality of packets 45. The frame clock forms the base clock from which different packet time periods and packet clocks are derived in constant sequence.

It is also conceivable that packets 45 be sent on the transmission line in so-called start/stop operation. In this case, the packets do not occur in a discernible rhythm and require special detection features in their header.

The construction of the directional coupler 30 can be optional with respect to substrate material, electrode arrangement, the type of rib waveguide, combination with additional couplers 30, connections to the waveguides leading to and away from, e.g. the fiber 1, etc. Future directional couplers based on fundamentally different laws can also be used.

The transmission equipment 10 described thus far comprises a transmission line which is constructed purely optically and without active electronic regenerators interrupting the line. Accordingly, there are no optoelectrical and/or electro-optical units which interrupt the light stream in its entirety or influence it in its entirety in some other way. Accordingly, all sources for the generation of jitter and phasing problems are dispensed with. The transmission equipment 10 is accordingly low in noise and interference.

The transmission equipment can be equipped with optical amplifiers for lengthening the bridgeable lines, which optical amplifiers increase the power of the light stream without interrupting it. The above-described light losses can accordingly be partially or even completely eliminated. The construction of the subscriber node 12 is not influenced by this.

The transmission equipment 10 serves exclusively for transmitting and receiving packets 45. The manner in which the subscriber nodes 12 can also send information is not discussed here.

While the foregoing description and drawings represent the preferred embodiments of the present invention, it will be obvious to those skilled in the art that various changes and modifications may be made therein without departing from the true spirit and scope of the present invention.

What is claimed is:

1. In transmission equipment with an optical transmission line to which a plurality of subscriber nodes are connected in series and a clock and packet generation unit which determines at least one rigid bit clock and packets for the transmission line, the packets each including a header and infopart, the header having a target addresses, each of the plurality of subscriber nodes having an assigned address, at least one transmitter for continuously transmitting packets on the transmission line, a synchronization unit which is adjusted to the bit clock so as to be in correct phase, an address detection unit, and a receiver for receiving information contained in the infopart of the packet, the improvement comprising that the transmission line is constructed so as to be purely optical without electronic regenerators interrupting the line, and in that an access unit and a control unit are provided in each of the plurality of subscriber nodes, the control unit comprises the address detection unit and is connected to the access unit and the receiver in such a way that the access unit is incorporated in the transmission line and can be switched into at least a first (a) and a second switching position (b), wherein the light power ($i_a$) which can be branched off from the transmission line in the first switching position (a) is less than the light power ($i_n$) which can be branched off in the second switching position, and wherein the light power ($i_a$) branched off in the first switching position (a) is fed at least to the address detection unit and the light power ($i_n$) branched off in the second switching position (b) is fed to the receiver.

2. The transmission equipment according to claim 1, wherein the light power ($i_a$) branched off in the first switching position (a) is considerably less than the light power ($i_n$) branched off in the second switching position (b).

3. The transmission equipment according to claim 1, wherein the transmission line is constructed as a waveguide for guiding light.

4. The transmission equipment according to claim 3, wherein the access unit comprises at least one controllable directional coupler having a transit path and a branch, the transit path being a component part of the waveguide and the branch being connected with the receiver.

5. The transmission equipment according to claim 4, wherein the access unit comprises a single controllable directional coupler, the branch being connected with the address detection unit.

6. The transmission equipment according to claim 4, wherein the access unit comprises first and second controllable directional couplers which are serial components of the waveguide, the branch of the first directional coupler being connected with the address detection unit and the branch of the second directional coupler being connected with the receiver.

7. The transmission equipment according to claim 4, wherein the access unit comprises a controllable and a non-controllable directional coupler which are serial components of the waveguide, in that the branch of the non-controllable directional coupler is connected with the address detection unit and the branch of the controllable directional coupler is connected with the receiver.

8. A method for operating transmission equipment corresponding to claim 1, wherein each of said plurality of subscriber nodes switches the access unit into the first switching position (a) for every passing packet using the control unit for the duration of the header of the packet, determining during the first switching position (a) whether the target address of the packet matches an address of the respective subscriber node, when the target address matches the address, the access unit switches into the second switching position (b) for the duration of the infopart of the packet, information contained in the infopart being fed to the receiver during the second switching position (b).

9. The method of operation according to claim 8, wherein the access unit remains in the first switching position (a) when the target address does not match the address of the subscriber node.

10. The method for operation according to claim 8, wherein the access unit is switched into a third switching position (c), said third switching position causing the light power ($I_a$, $i_n$) branched off form the transmission line to be substantially zero when the target address does not match the address of the subscriber node.

11. A method for shutting down at least a part of the transmission equipment corresponding to claim 1, wherein at least one subscriber node switches the access unit into a third switching position (c) in which the light power ($i_a$, $i_n$) branched off from the transmission line is substantially zero.

12. The method for shutting down according to claim 11, wherein the third switching position (c) is achieved when the access unit receives no control voltage from the control unit.

* * * * *